United States Patent
Dong (10) Patent No.: US 12,155,917 B2
(45) Date of Patent: Nov. 26, 2024

(54) CAMERA BRACKET AND ELECTRONIC DEVICE

(71) Applicant: HONOR DEVICE CO., LTD., Guangdong (CN)

(72) Inventor: Haoyuan Dong, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 266 days.

(21) Appl. No.: 17/778,451

(22) PCT Filed: Nov. 11, 2020

(86) PCT No.: PCT/CN2020/128006
§ 371 (c)(1),
(2) Date: May 20, 2022

(87) PCT Pub. No.: WO2021/104016
PCT Pub. Date: Jun. 3, 2021

(65) Prior Publication Data
US 2022/0407990 A1 Dec. 22, 2022

(30) Foreign Application Priority Data
Nov. 25, 2019 (CN) .......................... 201911166970.8

(51) Int. Cl.
*H04N 23/54* (2023.01)
*F16B 2/22* (2006.01)
*H04N 23/51* (2023.01)

(52) U.S. Cl.
CPC ............... *H04N 23/54* (2023.01); *F16B 2/22* (2013.01); *H04N 23/51* (2023.01)

(58) Field of Classification Search
CPC ........ H04N 23/54; H04N 23/51; H04N 23/57; H04M 1/0264
See application file for complete search history.

(56) References Cited

U.S. PATENT DOCUMENTS 7,717,744 B2   5/2010   Ma
7,802,996 B2   9/2010   Kusaki
(Continued)

FOREIGN PATENT DOCUMENTS

CN   201029132 Y   2/2008
CN   101170646 A   4/2008
(Continued)

OTHER PUBLICATIONS

Publication of CN110278363A (Year: 2019).*
Translation of publication CN110278363A (Year: 2019).*

*Primary Examiner* — Nicholas G Giles
(74) *Attorney, Agent, or Firm* — Fish & Richardson P.C.

(57) ABSTRACT

This application relates to the field of electronic device technologies, and in particular, to a camera bracket and an electronic device. The bracket includes a mounting frame, a mounting hole is provided in the mounting frame, and the mounting hole is configured to mount a camera. Side walls of the mounting hole include an elastic side wall and a non-elastic side wall. Hardness of the elastic side wall is less than that of the non-elastic side wall, and the elastic side wall and the non-elastic side wall are configured to be in contact with the camera. The bracket can facilitate mounting the camera in the mounting hole, and can also improve mounting reliability of the camera and mitigate a shaking risk of the camera in the mounting hole. In addition, during mounting of the camera, only an elastic structure is added on the bracket, to reduce costs.

11 Claims, 8 Drawing Sheets

(56) References Cited

U.S. PATENT DOCUMENTS

| | | | |
|---|---|---|---|
| 8,319,886 | B1 | 11/2012 | Wang et al. |
| 9,798,103 | B2 | 10/2017 | Lin et al. |
| 2008/0220663 | A1 | 9/2008 | Ma |
| 2011/0235195 | A1 | 9/2011 | Ke |
| 2018/0176351 | A1* | 6/2018 | Wei .................... H04M 1/0264 |
| 2019/0238668 | A1 | 8/2019 | Chen |
| 2022/0021790 | A1 | 1/2022 | Deng et al. |

FOREIGN PATENT DOCUMENTS

| | | |
|---|---|---|
| CN | 206650701 U | 11/2017 |
| CN | 206738860 U | 12/2017 |
| CN | 207124685 U | 3/2018 |
| CN | 108965669 A | 12/2018 |
| CN | 109257531 A | 1/2019 |
| CN | 209089012 U | 7/2019 |
| CN | 110278363 A | 9/2019 |
| CN | 110278364 A | 9/2019 |
| CN | 110913104 A | 3/2020 |
| WO | 2012026500 A1 | 3/2012 |
| WO | 2017084346 A1 | 5/2017 |

* cited by examiner

CAMERA BRACKET AND ELECTRONIC DEVICE

CROSS-REFERENCE TO RELATED APPLICATIONS

This application is a national stage of International Application No. PCT/CN2020/128006, filed on Nov. 11, 2020, which claims priority to Chinese Patent Application No. 201911166970.8, filed on Nov. 25, 2019. The disclosures of the aforementioned applications are hereby incorporated by reference in their entireties.

TECHNICAL FIELD

This application relates to the field of electronic device technologies, and in particular, to a camera bracket and an electronic device.

BACKGROUND

With development of electronic devices, users pose increasingly high requirements on performance of the electronic devices. An electronic device is usually provided with a camera, and shoots an external environment by using the camera. In the electronic device, the camera is usually mounted in a housing of the electronic device by using a bracket. To improve a shooting effect of the camera, it needs to be ensured that the camera is located at a proper position and is prevented from shaking.

SUMMARY

This application provides a camera bracket and an electronic device. The bracket can improve position precision of a camera, and mitigate a shaking risk of the camera.

A first aspect of this application provides a camera bracket. The bracket includes a mounting frame, a mounting hole is provided in the mounting frame, and the mounting hole is configured to mount a camera.

Side walls of the mounting hole include an elastic side wall and a non-elastic side wall. Hardness of the elastic side wall is less than that of the non-elastic side wall, and the elastic side wall and the non-elastic side wall are configured to be in contact with the camera. There may be one or more mounting holes. One camera may be mounted in each mounting hole.

In this embodiment, the bracket can facilitate mounting the camera in the mounting hole, and can also improve mounting reliability, and mitigate a shaking risk of the camera in the mounting hole. In addition, during mounting of the camera, only an elastic structure is added on the bracket, to reduce costs.

In a possible design, an elastic material of the elastic side wall is of an integrated structure, or the elastic material of the elastic side wall is of a separated structure.

In a possible design, an elastic pad is disposed on the mounting frame. The elastic pad includes convex portions, the convex portions protrude toward inside of the mounting hole, and the convex portions form the elastic side wall.

In a possible design, the elastic pad includes a plurality of the convex portions that are spaced. In this embodiment, a concave portion is formed between adjacent convex portions. When the camera is mounted in the mounting hole, the convex portions can deform toward the concave portions, to facilitate compression and deformation of the convex portions, thereby further reducing mounting difficulty of the camera. In addition, the concave portions can further alleviate stress concentration between the convex portions and the camera, to mitigate a risk of damaging the bracket and the camera in a mounting process.

In a possible design, the elastic pad further includes a first body portion. The first body portion is connected to the mounting frame, and the convex portions protrude relative to the first body portion. In this embodiment, the convex portions in interference fit with the camera are connected to form an integrated structure by using the first body portion. To be specific, the elastic pad is enabled to be of an integrated structure. The elastic pad of the integrated structure has an advantage of processing convenience, and can improve reliability of connection between the convex portions and the mounting frame, thereby improving mounting reliability of the camera.

In a possible design, the elastic pad includes a plurality of convex portions. The convex portions are of separated structures, and are connected to the mounting frame. In this embodiment, when the elastic pad of a separated structure is used, usage of elastic materials can be reduced, to help reduce a weight and a size of the electronic device.

In a possible design, the elastic pad includes flexible rubber. The mounting frame includes metal or hard plastic, and the elastic pad and the mounting frame are integrally formed or fixedly connected.

In a possible design, the mounting hole is of a square structure, and the side walls of the mounting hole include a first side wall and a second side wall that are disposed opposite to each other, and a third side wall and a fourth side wall that are disposed opposite to each other.

At least one part of one of the first side wall and the second side wall is the elastic side wall, and the other side wall is the non-elastic side wall; and at least one part of one of the third side wall and the fourth side wall is the elastic side wall, and the other side wall is the non-elastic side wall.

In a possible design, the mounting hole is of a circular structure, the elastic side wall is of an arc-shaped structure, and the non-elastic side wall is of an arc-shaped structure.

In a possible design, Shore hardness of the elastic material of the elastic side wall is in a range of 65 to 75 (including 65 and 75).

A second aspect of this application provides a camera module. The camera module includes a camera and a bracket, the bracket is the foregoing bracket, and the camera is mounted in a mounting hole of the bracket.

A third aspect of this application provides an electronic device. The electronic device includes a housing, a middle frame, a display, and a camera module.

The camera module includes:
one or more cameras;
a bracket, where the one or more cameras are mounted on the bracket, the bracket is the bracket according to the first aspect, and each camera is mounted in a mounting hole of the bracket, and
a camera decorating part, where the bracket is mounted in the camera decorating part.

The camera module and the display are mounted on the middle frame.

In the electronic device, the camera has relatively high position precision, and a relatively low shaking risk.

In a possible design, the camera is in interference fit with the elastic side wall, and a magnitude of interference between the camera and the elastic side wall is in a range of 0.01 mm to 0.1 mm (including 0.01 mm and 0.1 mm). In this way, the shaking risk of the camera can be mitigated, and structural strength of the bracket and the camera can be improved.

In a possible design, the camera abuts against the non-elastic side wall.

In a possible design, a contact area between the elastic side wall and the camera is in a range of 3 mm$^2$ to 6 mm$^2$ (including 3 mm$^2$ and 6 mm$^2$). This can improve mounting reliability of the camera in the mounting hole and reduce a mounting difficulty of the camera.

In a possible design, the camera decorating part includes an accommodating groove, and the bracket is located in the accommodating groove; limiting protrusions are also provided on the camera decorating part, a part of the limiting protrusions are located on two ends along a length direction of the bracket, and a part of the limiting protrusions are located on two ends along a width direction of the bracket; and the limiting protrusions abut against the bracket. In this embodiment, when the limiting protrusions are used, the shaking risk of the bracket along the length direction and the width direction can be mitigated, to improve the position precision of the bracket.

It should be understood that the foregoing general description and the following detailed description are merely examples, and cannot limit this application.

REFERENCE NUMERALS

1—bracket;
  11—mounting frame;
  12—separation part;
    131—first mounting hole;
    132—second mounting hole;
    133—third mounting hole;
  14—elastic pad;
    141—convex portion;
    142—concave portion;
    143—first body portion:
  15—first side wall;
  16—second side wall;
  17—third side wall;
  18—fourth side wall:
2—camera decorating part;
  21—second body portion:
    211—fourth mounting hole:
    212—fifth mounting hole;
    213—sixth mounting hole:
    214—mounting groove:
  22—flange:
    221—limiting protrusion:
3—camera; and
4—camera lens.

The accompanying drawings herein are incorporated into the specification and form a part of the specification, show embodiments conforming to this application, and are used together with the specification to explain a principle of this application.

DESCRIPTION OF EMBODIMENTS

To make the technical solutions in this application more comprehensible, the following describes the embodiments of this application in detail with reference to the accompanying drawings.

The terms used in the embodiments of this application are merely for the purpose of illustrating specific embodiments, and are not intended to limit this application. The terms "a", "said", and "the" of singular forms used in the embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that, position words such as "above", "below", "left", and "right" described in the embodiments of this application are described from angles shown in the accompanying drawings, and should not be construed as a limitation on the embodiments of this application. Moreover, in the context, it also should be understood that, when it is mentioned that one element is connected "above" or "below" another element, it cannot only be directly connected "above" or "below" the another element, but also be indirectly connected "above" or "below" the another element by using an intermediate element.

An electronic device includes components such as a housing, a middle frame, a camera, a display, a battery, and a camera decorating part. The battery is mounted on a battery rear cover, and components such as the camera and the display are mounted on the middle frame. Specifically, the camera is mounted by using a bracket, the bracket is mounted in the camera decorating part, and the camera decorating part is mounted on the battery rear cover. A camera lens is mounted on the camera decorating part. The camera corresponds to the camera lens, and can shoot an external environment through the camera lens. In addition, silk printing is usually performed on the camera lens, and a silk printing central hole is formed after the silk printing. The silk printing hole is light-permeable. To improve a shooting effect of the camera and appearance and performance of the electronic device, the camera needs to be concentric with the silk printing central hole. To be specific, during mounting of the camera, a degree of eccentricity between the camera and a camera lens silk screening hole needs to be reduced. To resolve the technical problem, position precision of the camera after the camera is mounted needs to be improved, and a shaking risk of the camera needs to be mitigated.

The technical problem is resolved in the conventional technology in the following two manners. In a first manner, the camera is fixed to the bracket through dispensing, and it is ensured to the greatest extent that the camera is concentric with the silk printing central hole of the camera lens, and the degree of eccentricity of the camera is reduced. However, in this manner, dispensing needs to be performed by using a dispensing device, and costs are relatively high. In a second manner, the camera is in clearance fit with the bracket, and relative positions of the camera and the bracket can be adjusted by using a clearance between the camera and the bracket, to reduce the degree of eccentricity of the camera. However, the clearance between the camera and the bracket causes relative shaking between the camera and the bracket, resulting in eccentricity of the camera.

In the embodiments of this application, position precision of a camera 3 is improved and shaking of the camera 3 is alleviated mainly by improving a specific structure of a bracket 1 of the camera 3.

Figure 8:
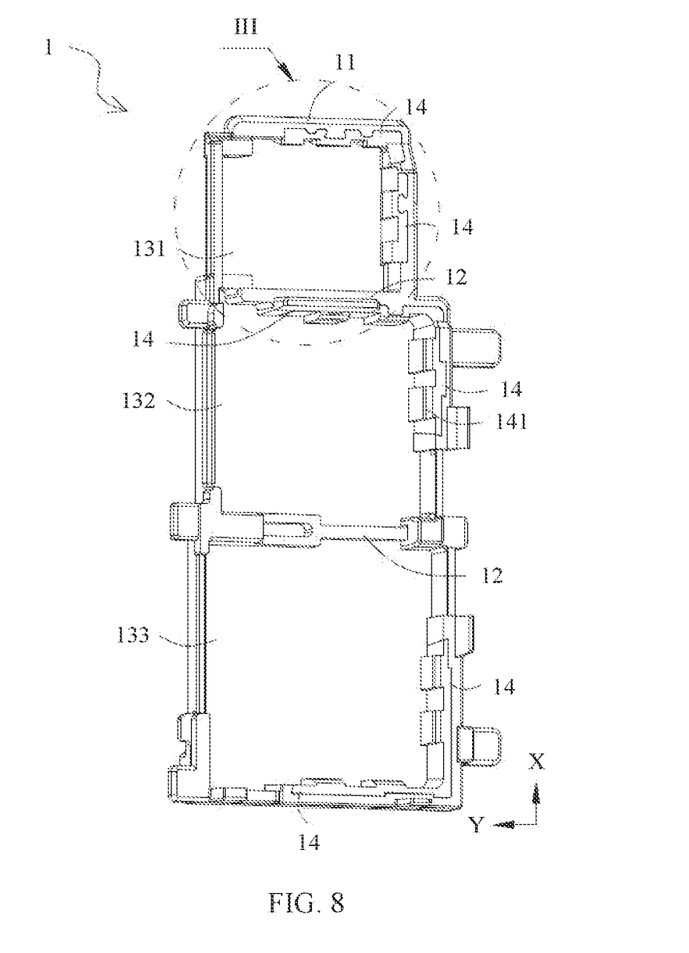
FIG. 8 is a schematic structural diagram of the bracket in FIG. 6.
Figure 9:
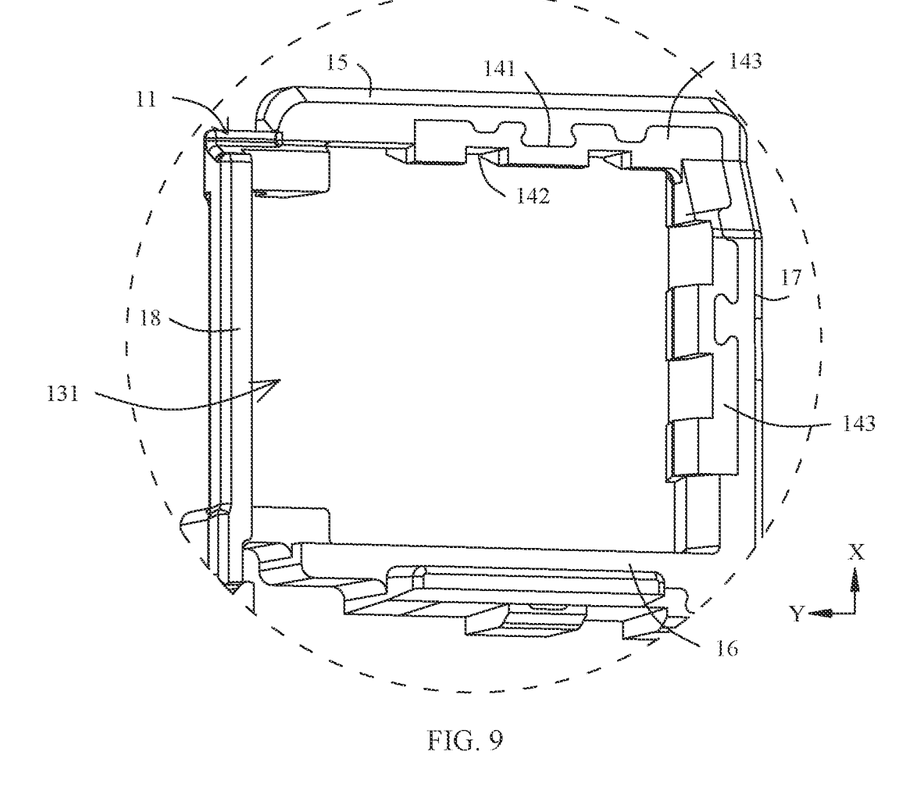
FIG. 9 is a partial enlarged view of part III in FIG. 8.

Specifically, an embodiment of this application provides a bracket 1 of a camera 3. As shown in FIG. 8 and FIG. 9, the bracket 1 includes a mounting frame 11, a mounting hole may be provided in the mounting frame 11, and the mounting hole is configured to mount the camera 3. The mounting frame 11 is of a structure with specific strength and rigidity. For example, the mounting frame 11 may be made of a material with specific hardness, such as hard rubber or metal, provided that structural strength for mounting the camera 3 can be satisfied.

In addition, the mounting frame 11 may specifically include one or more mounting holes. For example, in the embodiment shown in FIG. 8, the mounting frame 11 includes three mounting holes: a first mounting hole 131, a second mounting hole 132, and a third mounting hole 133. Therefore, the mounting frame 11 may be configured to mount three cameras 3. Certainly, the mounting frame 11 may alternatively include one, two, or more mounting holes. A quantity of mounting holes is not limited in this application.

In addition, as shown in FIG. 9, side walls of the mounting hole include elastic side walls and non-elastic side walls. Specifically, in the embodiment shown in FIG. 9, a shape of the mounting hole is approximately a rectangle, and the mounting hole includes fourth side walls: a first side wall 15 and a second side wall 16 that are disposed opposite to each other, and a third side wall 17 and a fourth side wall 18 that are disposed opposite to each other. In the foregoing four side walls, some are elastic side walls, and the others are non-elastic side walls. For example, in the first side wall 15 and the second side wall 16 that are disposed opposite to each other, the first side wall 15 is an elastic side wall, and the second side wall 16 is a non-elastic side wall; and in the third side wall 17 and the fourth side wall 18 that are disposed opposite to each other, the third side wall 17 is an elastic side wall, and the fourth side wall 18 is a non-elastic side wall. Certainly, in other embodiments, alternatively, the second side wall 16 and the fourth side wall 18 may be set to elastic side walls, and the first side wall 15 and the third side wall 17 may be set to non-elastic side walls.

Hardness of the elastic side wall is less than that of the non-elastic side wall, and the elastic side wall and the non-elastic side wall are configured to be in contact with the camera. It should be noted that, the non-elastic side wall mentioned in this application does not mean that the side wall cannot elastically deform, but means that an amount of elastic deformation of the non-elastic side wall is relatively small and is less than an amount of deformation of the elastic side wall.

In this embodiment, the non-elastic side wall may be formed by the mounting frame 11, and the mounting frame 11 is of a structure with relatively large hardness, so that the non-elastic side wall is of a structure with relatively large hardness. The elastic side wall may be formed of a rubber material with specific elasticity, so that hardness of the elastic side wall is less than that of the non-elastic side wall.

It should be noted that, the elastic side wall in this embodiment is not necessarily a continuous side wall, and may alternatively be a discontinuous side wall. To be specific, the elastic side wall in this embodiment is a filling region (the filling region is continuous) of elastic materials. The elastic materials may be filled at intervals or continuously in the filling region, and regardless of whether the elastic materials are filled at intervals or continuously, the elastic materials in the filling region form an elastic side wall of a mounting hole. Based on this, the foregoing non-elastic side wall is a non-filling region (the non-filling region is continuous). There is no elastic material in the non-filling region. The non-elastic side wall is a continuous side wall.

Figure 7:
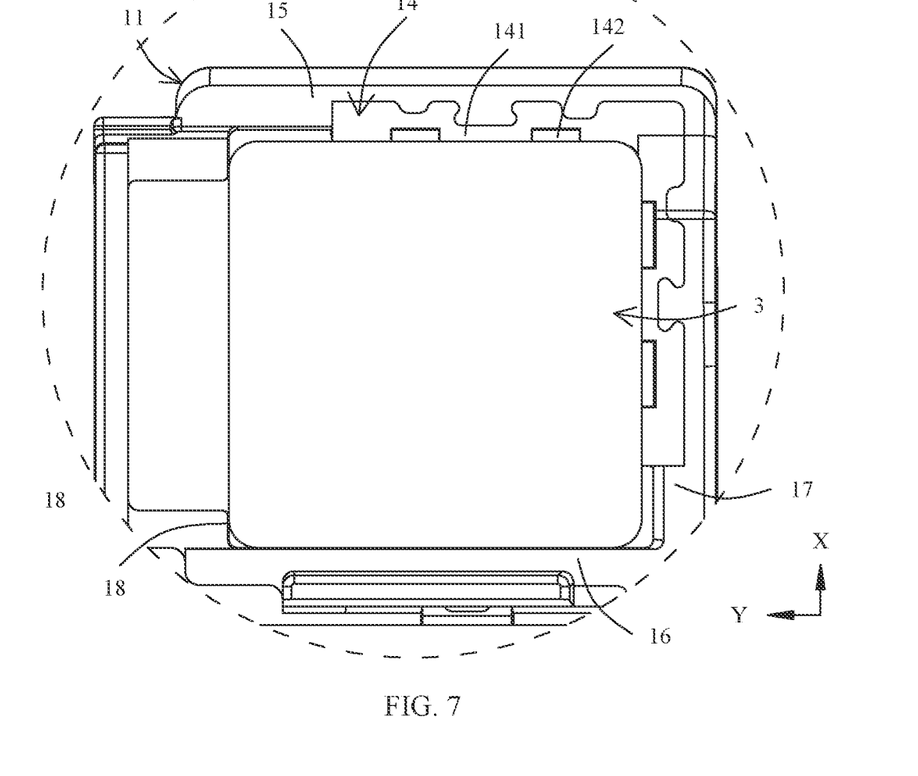
FIG. 7 is a partial enlarged view of part II in FIG. 6.

Specifically, as shown in FIG. 7, when the camera 3 is mounted in the mounting hole, the camera 3 is in interference fit with an elastic side wall of the mounting hole, and can compress the elastic side wall. After fitting ends, the elastic side wall springs back, so that the camera 3 abuts against a non-elastic side wall (the mounting frame 11) of the mounting hole, the camera 3 is reliably mounted, and the camera and the bracket form a camera module.

In this embodiment, in a process in which the camera 3 is mounted in the mounting hole, the elastic side wall can deform after being compressed, so that an area of the mounting hole can be increased, thereby facilitating mounting the camera 3 in the mounting hole. In addition, the elastic side wall can spring back after the camera 3 is mounted, so that the camera 3 abuts against the non-elastic side wall of the mounting hole. This improves the mounting reliability, mitigates a shaking risk of the camera 3 in the mounting hole, and reduces the degree of eccentricity of the camera 3, thereby improving a shooting effect of the camera 3 and the appearance and performance of the electronic device. In addition, during mounting of the camera 3, dispensing is not required, provided that an elastic structure is added on the bracket 1, so that costs can be reduced.

A magnitude of interference between the elastic side wall and the camera 3 should not be excessively large. When the magnitude of interference between the elastic side wall and the camera 3 is excessively large, during mounting of the camera 3, an interaction force between the elastic side wall and the camera 3 is relatively large, affecting strength of the elastic side wall and the camera 3. When the magnitude of interference between the elastic side wall and the camera 3 is excessively small, after the camera 3 is mounted, the camera 3 has a risk of shaking in the mounting hole, resulting in relatively low mounting reliability of the camera 3. In this embodiment, the magnitude of interference between the elastic side wall and the camera 3 may be in a range of 0.01 mm to 0.1 mm (including 0.01 mm and 0.1 mm). In this way, the shaking risk of the camera 3 can be mitigated, and structural strength of the bracket 1 and the camera 3 can be improved.

Specifically, the magnitude of interference between the elastic side wall and the camera 3 may be 0.05 mm, 0.08 mm, or the like. During actual processing, the magnitude of interference between the elastic side wall and the camera 3 may be set according to structures and sizes of the elastic side wall and the camera 3.

More specifically, when the elastic side wall is in interference fit with the camera 3, a larger contact area between the elastic side wall and the camera 3 indicates a larger stress between the elastic side wall and the camera 3, as well as higher assembling difficulty, but higher mounting reliability of the camera 3 in the mounting hole. A smaller contact area between the elastic side wall and the camera 3 indicates a smaller stress between the elastic side wall and the camera 3, as well as lower mounting reliability of the camera 3 in the mounting hole, but lower processing difficulty, and a lower risk of damaging the bracket 1 and the camera 3 in the mounting process. Therefore, in this embodiment, the contact area between the elastic side wall and the camera 3 should not be excessively small, and should not be excessively large, either, and may be specifically in a range of 3 mm² to 6 mm² (including 3 mm² and 6 mm²), for example, 4 mm² or 5 mm². During actual processing, the contact area between the camera 3 and the elastic side wall may be properly determined based on a shape and a size of the camera 3.

In addition, in the foregoing embodiments, Shore hardness of the elastic side wall of the mounting hole may be in a range of 65 to 75 (including 65 and 75), for example, 68, 70, or 72. A material with the hardness may be specifically flexible rubber or flexible plastic.

Figure 6:
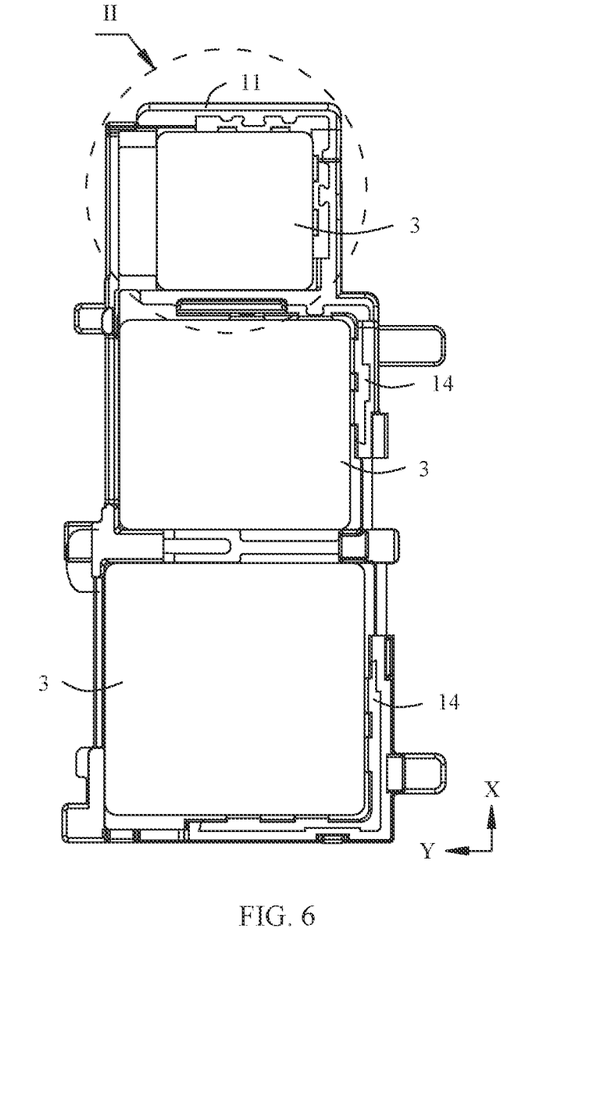
FIG. 6 is a schematic structural diagram of combination of the camera body and the bracket in FIG. 1.

As shown in FIG. 6 and FIG. 7, an elastic pad 14 is disposed on the mounting frame 11. The elastic pad 14 is made of a material with specific elasticity and relatively small hardness. When an external force is applied to the elastic pad 14, the elastic pad 14 can elastically deform, and when the external force is reduced or disappears, the elastic pad 14 can spring back. In this embodiment, the elastic pad 14 is disposed on the mounting frame 11, so that the elastic pad 14 forms the elastic side wall of the mounting hole, and the mounting frame 11 on which the elastic pad 14 is not disposed is used as the non-elastic side wall of the mounting hole.

Figure 10:
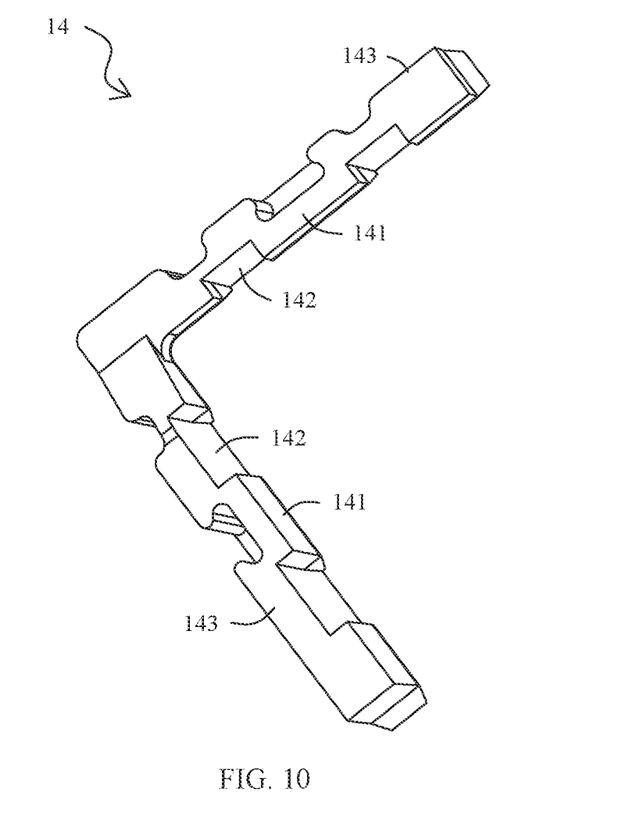
FIG. 10 is a schematic structural diagram of an elastic pad in FIG. 9.

Specifically, as shown in FIG. 7 and FIG. 10, the elastic pad 14 may include a plurality of spaced convex portions 141. The convex portions 141 protrude toward inside of the mounting hole. The convex portions 141 form the elastic side wall of the mounting hole. When the camera 3 is mounted in the mounting hole, the camera 3 is in interference fit with the convex portion 141, and a contact area between the camera 3 and the convex portion 141 may be in a range of 3 mm² to 6 mm² (including 3 mm² and 6 mm²). To be specific, a cross-sectional area of the convex portion 141 may be in a range of 3 mm² to 6 mm² (including 3 mm² and 6 mm²). In this way, the mounting reliability of the camera 3 in the mounting hole can be improved, and the mounting difficulty of the camera 3 can be reduced.

A shape of the convex portion 141 may be a square, a circle, or another common shape, provided that the contact area between the convex portion 141 and the camera 3 is proper. In addition, when the contact area between the camera 3 and the convex portion 141 is in a range of 3 mm² to 6 mm² (including 3 mm² and 6 mm²), and the convex portion 141 is of a cuboid (or cube) structure, a width of the convex portion 141 is in a range of 1 mm to 2 mm (including 1 mm and 2 mm), and may be specifically 1.5 mm. In the embodiment shown in FIG. 7, the width of the convex portion 141 may be a size in a direction Y shown in FIG. 7.

More specifically, as shown in FIG. 10, the elastic pad 14 may include a plurality of convex portions 141, and adjacent convex portions 141 are spaced from each other. A plurality spaced convex portions 141 form the elastic side wall of the mounting hole. When the camera 3 is mounted in the mounting hole, the camera 3 is in interference fit with each convex portion 141, and a contact area between each convex portion 141 and a camera 3 may be in a range of 3 mm² to 6 mm² (including 3 mm² and 6 mm²). To be specific, the cross-sectional area of the convex portion 141 may be in a range of 3 mm² to 6 mm² (including 3 mm² and 6 mm²). A larger quantity of convex portions 141 of the elastic pad 14 indicates a larger contact area between the elastic pad 14 and each camera 3, and higher reliability of connection between the elastic pad 14 and the camera 3. In this way, the mounting reliability of the camera 3 in the mounting hole can be improved, and the mounting difficulty of the camera 3 can be reduced.

The elastic side wall of the mounting hole is of a discontinuous structure. To be specific, a plurality of spaced convex portions 141 form the elastic side wall, and a region in which the convex portions 141 are located is a filling region of the side wall of the mounting hole.

In this embodiment, a concave portion 142 is formed between adjacent convex portions 141. When the camera 3 is mounted in the mounting hole, the convex portions 141 can deform toward the concave portions 142. In other words, settings of the concave portions 142 can provide space for deformation of the convex portions 141. This facilitates compression and deformation of the convex portions 141, thereby further reducing the mounting difficulty of the camera 3. In addition, the concave portions 142 can further alleviate stress concentration between the convex portions 141 and the camera 3, to mitigate the risk of damaging the bracket 1 and the camera 3 in the mounting process.

In a possible design, as shown in FIG. 7 and FIG. 10, the elastic pad 14 includes a first body portion 143 and the convex portions 141. The first body portion 143 and the convex portions 141 are fixedly connected or integrally formed. The first body portion 143 is connected to the mounting frame 11, and the convex portions 141 protrude relative to the first body portion 143.

In this embodiment, the convex portions 141 in interference fit with the camera 3 are connected into an integrated structure by using the first body portion 143, so that the elastic pad 14 is of an integrated structure. In addition, the convex portions 141 are connected to the mounting frame 11 by using the first body portion 143. In this embodiment, the elastic pad 14 of the integrated structure has an advantage of processing convenience, and can improve reliability of connection between the convex portions 141 and the mounting frame 11, thereby improving the mounting reliability of the camera 3.

In another specific embodiment, the elastic pad 14 may alternatively include only a plurality of convex portions 141, and the convex portions 141 are of separated structures. When the convex portions 141 are connected to the mounting frame 11, the elastic pad 141 is formed. In this embodiment, when the elastic pad 14 of a separated structure is used, usage of elastic materials can be reduced, to help reduce a weight and a size of the electronic device.

In a possible design, the elastic pad 14 includes a flexible rubber material. Flexible rubber is a material formed through plastic injection molding, and has a feature of relatively small hardness. In addition, the flexible rubber can spring back after forced deformation. In addition, the mounting frame 11 may include a metal or hard plastic material. Hard plastic is a material formed through plastic injection molding, and has a feature of relatively high hardness. In addition, hardness of the hard plastic is greater than that of the flexible rubber, and an elastic coefficient of the hard plastic is less than that of the flexible rubber. In a possible design, the elastic pad 14 includes one or more of Rubber, TPU (Thermoplastic polyurethanes), TPEE (Thermoplastic Polyether Ester Elastomer).

In this embodiment, the elastic pad 14 and the mounting frame 11 may be integrally formed through double-shot molding. To be specific, the bracket 1 (including the mounting frame 11 and the elastic pad 14) may be of an integrally formed structure. The double-shot molding means inject-molding two different materials into a same set of mold, to implement a forming process in which a part formed through injection molding is formed of two materials. The two materials may be materials with different colors or different hardness.

Therefore, the flexible rubber and metal may be formed into the bracket 1 through double-shot molding, or the hard plastic and the metal may be formed into the bracket 1 through double-shot molding.

In a specific embodiment, as shown in FIG. 7, the mounting hole of the mounting frame 11 is of a square structure. To be specific, side walls of the mounting hole include the first side wall 15 and the second side wall 16 that are disposed opposite to each other, and the third side wall 17 and the fourth side wall 18 that are disposed opposite to each other. In addition, the first side wall 15 is adjacent to the third side wall 17 and the fourth side wall 18, and the four side walls define a mounting hole of the mounting frame 11 through enclosure.

At least one part of the first side wall 15 is an elastic side wall. To be specific, the foregoing elastic materials (for example, the elastic pad 14) may be filled in at least one part of the first side wall 15. When the elastic materials are filled in one part of the first side wall 15, the first side wall 15 includes an elastic side wall and a non-elastic side wall. Correspondingly, the second side wall 16 disposed opposite to the first side wall 15 is a non-elastic side wall. To be specific, no elastic materials (for example, the elastic pad 14) are filled in the second side wall 16. It should be noted that, at least one part of one of the first side wall 15 and the second side wall 16 may be an elastic side wall, and the other side wall is a non-elastic side wall. To be specific, alternatively, at least one part of the second side wall 16 is an elastic side wall, and the first side wall 15 is a non-elastic side wall.

Similarly, at least one part of the third side wall 17 is an elastic side wall. To be specific, the foregoing elastic materials (for example, the elastic pad 14) may be filled in at least one part of the third side wall 17. When the elastic materials are filled in one part of the third side wall 17, the third side wall includes an elastic side wall and a non-elastic side wall. Correspondingly, the fourth side wall 18 disposed opposite to the third side wall 17 is a non-elastic side wall. To be specific, no elastic materials (for example, the elastic pad 14) are filled in the fourth side wall 18. It should be noted that, at least one part of one of the third side wall 17 and the fourth side wall 18 may be an elastic side wall, and the other side wall is a non-elastic side wall. To be specific, alternatively, at least one part of the fourth side wall 18 is an elastic side wall, and the third side wall 17 is a non-elastic side wall.

In this embodiment, elastic side walls are located on two adjacent side walls of the square mounting hole. To be specific, the elastic side walls may be disposed on the first side wall 15 and the third side wall 17 (as shown in FIG. 9), or the first side wall 15 and the fourth side wall 18, or the second side wall 16 and the third side wall 17, or the second side wall 16 and the fourth side wall 18. In addition, using an example in which the first side wall 15 includes an elastic side wall, the elastic pad 14 disposed on the first side wall 15 may be of a continuous-shaped structure or a discontinuous-shaped structure.

Using the embodiment shown in FIG. 9 as an example, in a process in which the camera 3 is mounted in the mounting hole, under an effect of an external force, the camera 3 is in interference fit with the elastic materials, and the elastic materials (for example, the elastic pad) disposed on the first side wall 15 and the third side wall 17 are compressed to deform, to facilitate placing the camera 3 into the mounting hole. When the external force is reduced or disappears, under an effect of resilience of the elastic materials, a position of the camera 3 in the mounting hole changes. To be specific, the camera 3 has a tendency of moving toward the second side wall 16 and the fourth side wall 18, so that the camera 3 abuts against the second side wall 16 and the fourth second side wall 18, or the camera 3 is in contact with the second side wall 16 and the fourth side wall 18 without a clearance. To be specific, an interaction force between the camera 3 and the second side wall 16 and the fourth side wall 18 is relatively small. In this way, the camera 3 is mounted. In addition, after the camera 3 is mounted, the camera 3 may still be in interference fit with the elastic side walls. This improves the mounting reliability of the camera 3, and reduces the degree of eccentricity of the camera 3.

Specifically, as shown in FIG. 9 and FIG. 10, elastic pads 14 disposed on adjacent side walls are connected to each other or integrally formed, forming a structure shown in FIG. 10. To be specific, the elastic pad 14 is approximately L-shaped, so that areas of elastic side walls can be increased. During processing, the elastic pad 14 may be flexible rubber of an L-shaped structure, and the flexible rubber and hard plastic or the flexible rubber and metal are processed by using a double-shot molding process, to form the bracket 1 shown in FIG. 8.

Certainly, elastic pads 14 on adjacent side walls may alternatively be of separated structures. In other words, two elastic pads 14 disposed on adjacent side walls are separated from each other. In this case, usage of elastic materials can be reduced.

According to another aspect, in the embodiment shown in FIG. 8, a separation part 12 may be disposed in the mounting frame 11. For example, two separation parts 12 may be disposed, to divide the mounting frame 11 into three mounting holes: a first mounting hole 131, a second mounting hole 132, and a third mounting hole 133. The three mounting holes can all be configured to mount cameras 3.

Based on this, because the separation part 12 is side walls of two adjacent mounting holes, the separation part 12 may be used as elastic side walls or non-elastic side walls of the adjacent mounting holes. Using FIG. 8 as an example, in the separation part 12 between the first mounting hole 131 and the second mounting hole 132, a side facing toward inside of the first mounting hole 131 is a non-elastic side wall, and a side facing toward inside of the second mounting hole 132 is an elastic side wall. Therefore, when cameras 3 are mounted in the first mounting hole 131 and the second mounting hole 132, one camera 3 is in interference fit with the separation part 12, and the other camera 3 abuts against the separation part 12. In other words, an acting force acting on the separation part 12 is not excessively large. This improves structural strength of the separation part 12.

In the separation part 12 between the second mounting hole 132 and the third mounting hole 133, both a side facing toward the second mounting hole 132 and a side facing toward the third mounting hole 133 may be non-elastic side walls. Therefore, when cameras 3 are mounted in the second mounting hole 132 and the third mounting hole 133, the two cameras 3 both abut against the separation part 12. Therefore, an acting force acting on the separation part 12 is relatively small, thereby improving structural strength of the separation part 12.

In addition, when cameras 3 are mounted in adjacent mounting holes, the two cameras 3 may both be in interference fit with the separation part 12 between the two mounting holes. To be specific, two sides of the separation part 12 between the adjacent mounting holes may both be used as elastic side walls. In this case, an acting force acting on the separation part 12 is relatively large.

In another possible design, the mounting hole of the bracket 1 may alternatively be of a circular structure. In this case, a base of the camera 3 is of a circular structure matching the mounting hole. Therefore, in the mounting hole, both an elastic side wall and a non-elastic side wall may be of arc-shaped structures.

In addition, in this embodiment, a central angle of an elastic side wall may be the same as or different from that of a non-elastic side wall.

Figure 5:
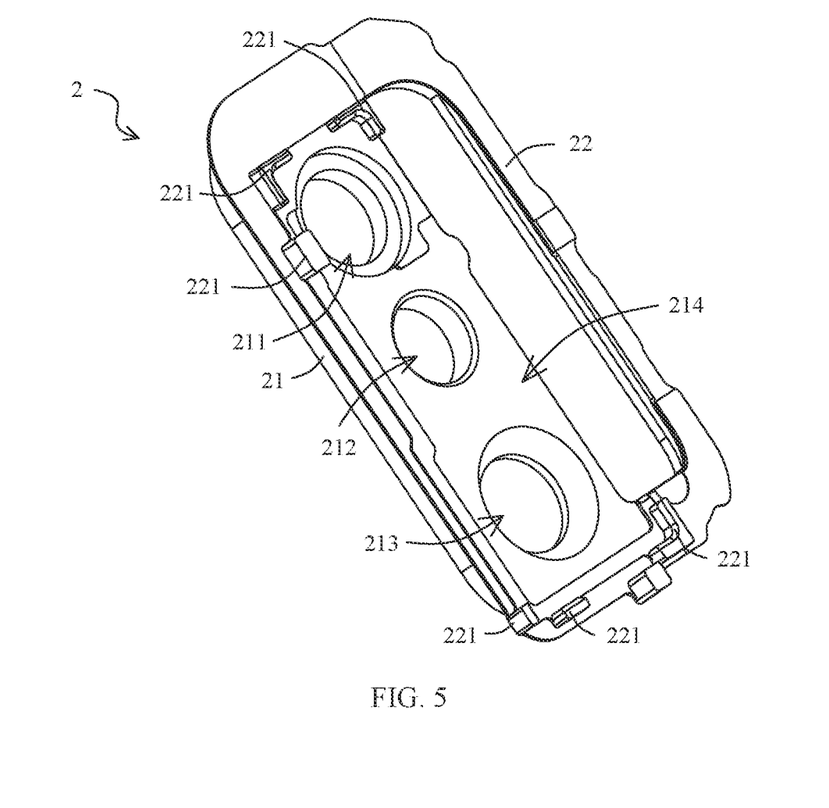
FIG. 5 is a schematic structural diagram of the camera decorating part in FIG. 1.

In the foregoing embodiments, the electronic device further includes components such as a camera decorating part 2, a middle frame, and a rear battery cover. The bracket 1 can be mounted in the camera decorating part 2. Specifically, as shown in FIG. 5, the camera decorating part 2 includes a second body portion 21 and a flange 22. The flange 22 is disposed on a periphery of the second body portion 21, and a mounting groove 214 is provided in the second body portion 21. The bracket 1 is mounted in the mounting groove 214. A fourth mounting hole 211, a fifth mounting hole 212, and a sixth mounting hole 213 are provided in a bottom wall of the mounting groove 214. The foregoing three mounting holes respectively correspond to three cameras 3. When the bracket 1 is mounted in the camera decorating part 2, the three cameras 3 are respectively located in the fourth mounting hole 211, the fifth mounting hole 212, and the sixth mounting hole 213.

Figure 3:
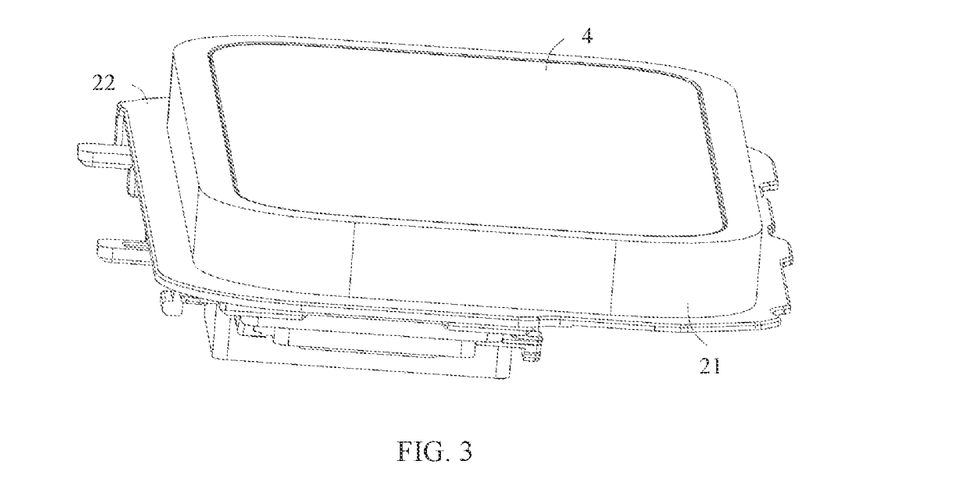
FIG. 3 is a schematic structural diagram of FIG. 1 from another angle of view.
Figure 4:
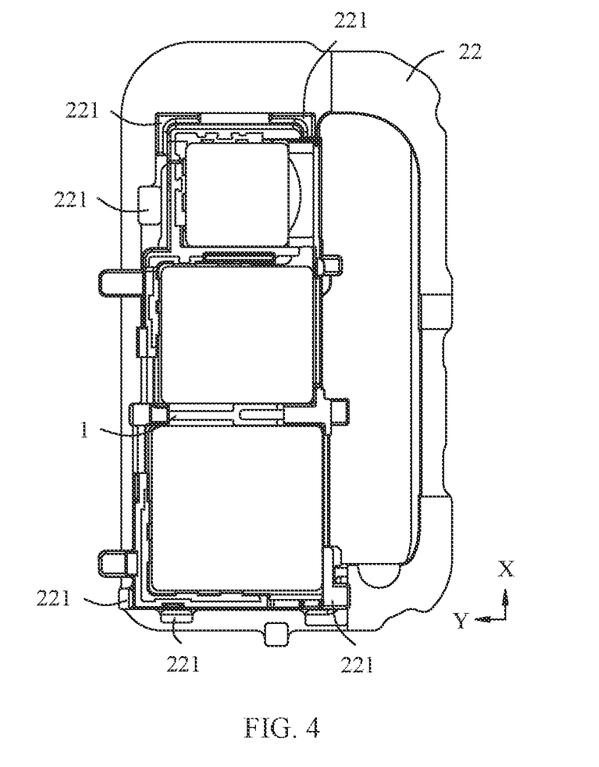
FIG. 4 is a top view of FIG. 1.

As shown in FIG. 3, a camera lens 4 is disposed on a back surface of the camera decorating part 2, and the cameras 3 correspond to the camera lens 4 respectively through the fourth mounting hole 211, the fifth mounting hole 212, and the sixth mounting hole 213. In this way, an external environment can be shot through the camera lens 4, and a user can observe the cameras 3 through the camera lens 4.

One camera lens 4 may be disposed on the camera decorating part 2, and the camera lens 4 corresponds to the cameras 3 (for example, when three cameras 3 are included, the camera lens 4 corresponds to the three cameras 3). Alternatively, a quantity of camera lenses 4 in the camera decorating part 2 may be the same as that of cameras 3 (for example, when three cameras 3 are included, the camera decorating part 2 includes three camera lenses 4), and the camera lenses 4 are in one-to-one correspondence to the cameras 3.

Moreover, to improve the shooting effect and the appearance and performance of the camera 3, a degree of concentricity between each camera 3 and a silk printing central hole in the camera lens 4 needs to be improved. To be specific, mounting precision of the camera 3 needs to be improved, and shaking of the camera 3 in the bracket 1 needs to be alleviated.

To resolve the technical problem, an elastic material is added on a side wall of the mounting hole of the bracket 1, to improve position precision of the camera 3 in the mounting hole of the bracket 1, and alleviate shaking of the camera 3 in the mounting hole. In addition, because the bracket 1 is mounted in the camera decorating part 2, position precision of the bracket 1 in the camera decorating part 2 further needs to be improved, and a shaking risk of the bracket 1 in the mounting groove 214 of the camera decorating part 2 needs to be mitigated.

Figure 1:
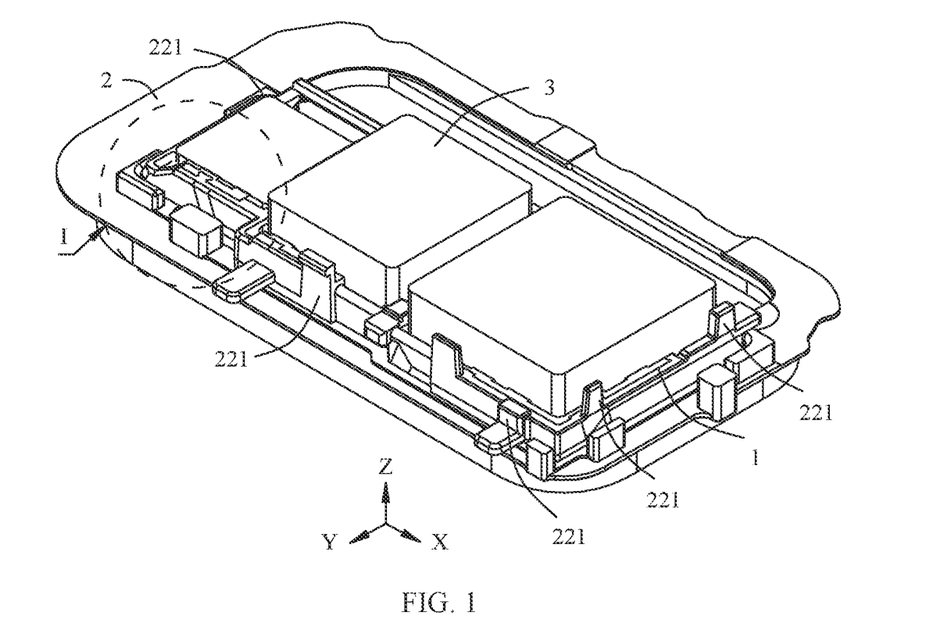
FIG. 1 is a schematic structural diagram of combination of a camera body, a bracket, and a camera decorating part according to an embodiment of this application.
Figure 2:
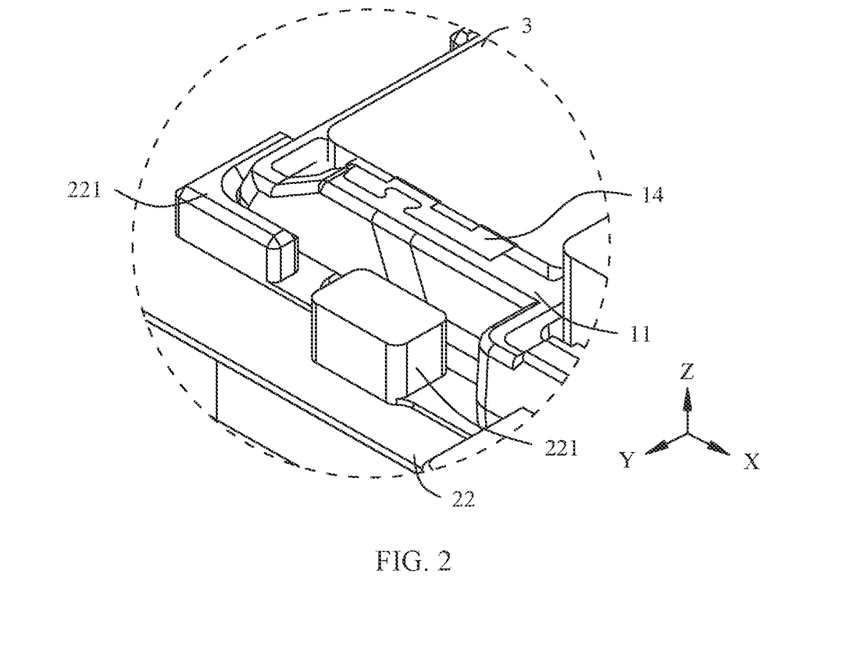
FIG. 2 is a partial enlarged view of part I in FIG. 1.

Specifically, as shown in FIG. 1, FIG. 2, and FIG. 5, limiting protrusions 221 are disposed on the flange 22 of the camera decorating part 2. Each limiting protrusion 221 abuts against the bracket 1, to alleviate shaking of the bracket 1 in the camera decorating part 2, thereby improving position precision of the bracket 1.

Specifically, limiting protrusions 221 are disposed on both two ends of the flange 22 along a length direction X of the bracket 1, and the limiting protrusions 221 located on the two ends along the length direction X can limit shaking of the bracket 1 along the length direction X. In addition, limiting protrusions 221 are disposed on both two ends of the flange 22 along a width direction Y of the bracket 1, and the limiting protrusions 221 located on the two ends along the width direction Y can limit shaking of the bracket 1 along the width direction Y, thereby mitigating a shaking risk of the bracket 1 in the camera decorating part 2.

During mounting of the camera 3 in the embodiments of this application, the camera 3 is first mounted on the middle frame, and then the camera 3 is connected to the bracket (the camera 3 is in interference fit with an elastic side wall of the mounting hole, and abuts against a non-elastic side wall), to form a camera module. Alternatively, the camera 3 may be first mounted on the bracket 1, to form the camera module, and then the camera module is mounted on the middle frame. Then, the bracket 1 is mounted in the mounting groove 214 of the camera decorating part 2, and is limited by using the limiting protrusions 221. The camera lens 4 is mounted on the camera decorating part 2, so that the camera 3 is concentric with the silk printing central hole of the camera lens 4. When the electronic device includes a plurality of cameras 3 (for example, three cameras 3), the camera lens 4 may be correspondingly provided with a plurality of silk printing central holes (for example, three silk printing central holes), and the cameras 3 are enabled to correspond to the corresponding silk printing central holes. The camera decorating part 2 is mounted on the battery rear cover of the electronic device.

In conclusion, the bracket 1 provided in the embodiments of this application can effectively improve the position precision of the camera 3, and mitigate the shaking risk of the camera 3, to reduce the degree of eccentricity between the camera 3 and the camera lens 4, improve the shooting effect of the camera 3, and improve the appearance and performance of the electronic device.

The foregoing descriptions are mere embodiments of this application, but are not intended to limit this application. For a person skilled in the art, various changes and variations may be made in this application. Any modification, equivalent replacement, or improvement made without departing from the principle of this application shall fall within the protection scope of this application.

What is claimed is:

1. A camera bracket, wherein the bracket comprises a mounting frame, a mounting hole is provided in the mounting frame, and the mounting hole is configured to mount a camera; and side walls of the mounting hole comprise an elastic side wall and a non-elastic side wall, hardness of the elastic side wall is less than that of the non-elastic side wall, and the elastic side wall and the non-elastic side wall are configured to be in contact with the camera, wherein a contact area between the elastic side wall and the camera is in a range of 3 mm$^2$ to 6 mm$^2$;

an elastic pad is disposed on the mounting frame, the elastic pad comprises a plurality of convex portions, the convex portions protrude toward inside of the mounting hole, and the convex portions form the elastic side wall.

2. The bracket according to claim 1, wherein an elastic material of the elastic side wall is of an integrated structure, or the elastic material of the elastic side wall is of a separated structure.

3. The bracket according to claim 1, wherein the elastic pad further comprises a first body portion, the first body portion is connected to the mounting frame, and the convex portions protrude relative to the first body portion.

4. The bracket according to claim 1, wherein the elastic pad comprises Rubber, TPU, and TPEE, the mounting frame comprises metal or hard plastic, and the elastic pad and the mounting frame are integrally formed or fixedly connected.

5. The bracket according to claim 1, wherein the mounting hole is of a square structure, and the side walls of the mounting hole comprise a first side wall and a second side wall that are disposed opposite to each other, and a third side wall and a fourth side wall that are disposed opposite to each other; and at least one part of one of the first side wall and the second side wall is the elastic side wall, and the other side wall is the non-elastic side wall; and at least one part of one of the third side wall and the fourth side wall is the elastic side wall, and the other side wall is the non-elastic side wall.

6. The bracket according to claim 1, wherein the mounting hole is of a circular structure, the elastic side wall is of an arc-shaped structure, and the non-elastic side wall is of an arc-shaped structure.

7. The bracket according to claim 1, wherein Shore hardness of the elastic material of the elastic side wall is in a range of 65 to 75.

8. An electronic device, wherein the electronic device comprises:

a camera;

a bracket, wherein the camera is mounted on the bracket, and the bracket is the bracket according to claim 1; and a camera decorating part, wherein the bracket is mounted in the camera decorating part.

9. The electronic device according to claim 8, wherein the camera is in interference fit with the elastic side wall, and a magnitude of interference between the camera and the elastic side wall is in a range of 0.01 mm to 0.1 mm.

10. The electronic device according to claim 8, wherein the camera abuts against the non-elastic side wall.

11. The electronic device according to claim 8, wherein the camera decorating part comprises an accommodating groove, and the bracket is located in the accommodating groove;

a plurality of limiting protrusions are also provided on the camera decorating part, a part of the limiting protrusions are located on two ends along a length direction of the bracket, and a part of the limiting protrusions are located on two ends along a width direction of the bracket; and the limiting protrusions abut against the bracket.

* * * * *